(12) United States Patent
Taki et al.

(10) Patent No.: US 10,771,716 B2
(45) Date of Patent: Sep. 8, 2020

(54) CONTROL DEVICE, MONITORING SYSTEM, AND MONITORING CAMERA CONTROL METHOD

(71) Applicant: KYOCERA Document Solutions Inc., Osaka (JP)

(72) Inventors: Kosuke Taki, Osaka (JP); Yoichi Hiranuma, Osaka (JP); Fumiya Sakashita, Osaka (JP); Shoichi Sakaguchi, Osaka (JP); Shohei Fujiwara, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/365,797

(22) Filed: Mar. 27, 2019

(65) Prior Publication Data
US 2019/0306433 A1    Oct. 3, 2019

(30) Foreign Application Priority Data

Mar. 29, 2018  (JP) ................................. 2018-063965

(51) Int. Cl.
*H04N 7/18*     (2006.01)
*H04N 5/247*    (2006.01)
*H04N 5/232*    (2006.01)
*G06K 9/00*     (2006.01)
*G06F 3/0488*   (2013.01)

(52) U.S. Cl.
CPC ......... *H04N 5/247* (2013.01); *H04N 5/23219* (2013.01); *H04N 7/181* (2013.01); *G06F 3/04883* (2013.01); *G06K 9/00288* (2013.01)

(58) Field of Classification Search
CPC ............ G06F 3/04883; G06K 9/00288; H04N 5/23219; H04N 5/247; H04N 7/181
See application file for complete search history.

(56) References Cited

U.S. PATENT DOCUMENTS

| | | | |
|---|---|---|---|
| 9,781,336 B2 | 10/2017 | Yoshio et al. | |
| 2003/0085992 A1* | 5/2003 | Arpa ................ | G08B 13/19608 348/47 |
| 2008/0263592 A1* | 10/2008 | Kimber ................. | G06F 3/0486 725/38 |
| 2009/0262206 A1* | 10/2009 | Park ................... | H04N 5/23203 348/218.1 |

(Continued)

FOREIGN PATENT DOCUMENTS

WO    2013/114862 A1    8/2013

*Primary Examiner* — Jessica M Prince
(74) *Attorney, Agent, or Firm* — Studebaker & Brackett PC (57) ABSTRACT

A monitoring system includes a plurality of cameras and a control device. The control device includes device storage, an output device, and an input device. The device storage stores therein an image captured by each camera of the plurality of cameras. The output device displays an image exhibiting a positional relationship of the plurality of cameras. The input device sets tracking information for tracking a specific tracking target in the captured images to one camera among the plurality of cameras. When an imaginary movement line is input on the image exhibiting the positional relationship of the cameras, the input device sets the tracking information to one or more cameras corresponding to the imaginary movement line among the plurality of cameras other than the one camera.

10 Claims, 10 Drawing Sheets

(56) References Cited

U.S. PATENT DOCUMENTS

| | | | |
|---|---|---|---|
| 2014/0362215 A1 | 12/2014 | Yoshio et al. | |
| 2015/0015718 A1* | 1/2015 | Fujimatsu | G06K 9/00771 348/159 |
| 2016/0349972 A1* | 12/2016 | Miyoshi | G06F 16/26 |
| 2018/0033153 A1* | 2/2018 | Hirasawa | G06K 9/00 |
| 2018/0097991 A1* | 4/2018 | Hachimura | H04N 5/247 |

* cited by examiner

CONTROL DEVICE, MONITORING SYSTEM, AND MONITORING CAMERA CONTROL METHOD

INCORPORATION BY REFERENCE

The present application claims priority under 35 U.S.C. § 119 to Japanese Patent Application No. 2018-063965, filed on Mar. 29, 2018. The contents of this application are incorporated herein by reference in their entirety.

BACKGROUND

The present disclosure relates to a control device, a monitoring system, and a monitoring camera control method.

A known optimum camera setting system includes a person tracking section, a person analysis section, a camera installation condition estimation section, and a user presentation section. The person tracking section detects a person from an image captured by a camera which captures an image of a subject and tracks the detected person. The person analysis section extracts items including a number of face detections, a moving direction, a facing direction, a focus, a dynamic range, and a view angle as store visitor information with respect to the person who is tracked through the person tracking section. The camera installation condition estimation section estimates whether installation conditions including an installation position, a height, the view angle and the focus of the camera are appropriate based on the store visitor information extracted by the person analysis section. The user presentation section presents a result estimated by the camera installation condition estimation section. Specifically, the optimum camera setting system presents installation conditions such as the installation position, the height, the view angle, and the focus of the camera which are optimum for image recognition processing such as facial collating and estimating age and gender to a user. Setting of the installation position, the height, the view angle, and the focus of the camera can be simply performed, thereby achieving an improvement in operational efficiency.

SUMMARY

A control device according to an aspect of the present disclosure controls a plurality of imaging devices. The control device includes storage, a display section, and an input section. The storage stores therein an image captured by each imaging device of the plurality of imaging devices. The display section displays an image exhibiting a positional relationship of the plurality of imaging devices. The input section sets tracking information for tracking a specific tracking target in the captured images to one imaging device among the plurality of imaging devices. When an imaginary movement line is input on the image exhibiting the positional relationship of the plurality of imaging devices, the input section sets the tracking information to one or more imaging devices corresponding to the imaginary movement line among the plurality of imaging devices other than the one imaging device.

A monitoring system according to an aspect of the present disclosure includes a plurality of imaging devices and a control device. The control device includes storage, a display section, and an input section. The storage stores therein an image captured by each imaging device of the plurality of imaging devices. The display section displays an image exhibiting a positional relationship of the plurality of imaging devices. The input section sets tracking information for tracking a specific tracking target in the captured images to one imaging device among the plurality of imaging devices. When an imaginary movement line is input on the image exhibiting the positional relationship of the plurality of imaging devices, the input section sets the tracking information to one or more imaging devices corresponding to the imaginary movement line among the plurality of imaging devices other than the one imaging device.

A monitoring camera control method according to an aspect of the present disclosure is for setting a plurality of imaging devices under the control of a control device. The monitoring camera control method includes storing, displaying, and setting. In the storing, the control device stores an image captured by each imaging device of the plurality of imaging devices. In the displaying, an image exhibiting a positional relationship of the plurality of imaging devices is displayed. In the setting, tracking information for tracking a specific tracking target in the captured images is set to one imaging device among the plurality of imaging devices. Also in the setting, when an imaginary movement line is input by an input section on the image exhibiting the positional relationship of the plurality of imaging devices, the tracking information is set to one or more imaging devices corresponding to the imaginary movement line among the plurality of imaging devices other than the one imaging device.

DETAILED DESCRIPTION

The following describes a monitoring system according to embodiments of the present disclosure with reference to the accompanying drawings. Elements that are the same or equivalent are labelled with the same reference signs in the drawings and description thereof is not repeated.

First Embodiment

Figure 1:
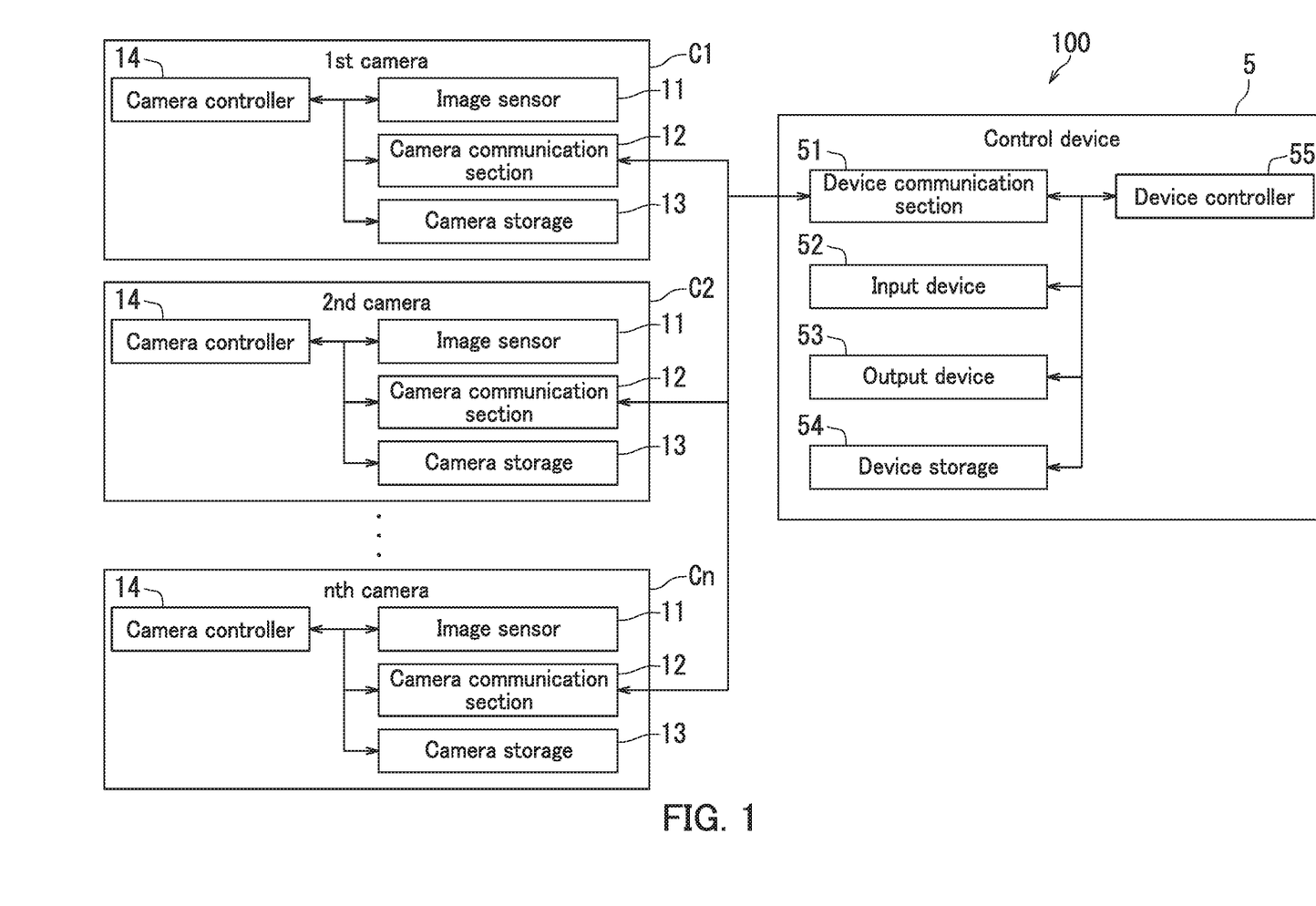
FIG. 1 is a diagram illustrating a configuration of a monitoring system according to a first embodiment of the present disclosure.

A monitoring system 100 according to a first embodiment of the present disclosure is described first with reference to FIG. 1. FIG. 1 is a diagram illustrating a configuration of the monitoring system 100 according to the first embodiment. The monitoring system 100 according to the present embodiment controls a plurality of cameras C1 to Cn and sets tracking information of a detection target to the cameras C1 to Cn. The detection target is set by an administrator of the monitoring system 100. The detection target is the face or entire body of a specific person, for example. The detection target is an example of a specific tracking target.

As illustrated in FIG. 1, the monitoring system 100 includes the cameras C1 to Cn and a control device 5. Each of the cameras C1 to Cn is an example of an imaging device.

The cameras C1 to Cn each include an image sensor 11, a camera communication section 12, camera storage 13, and a camera controller 14. According to the first embodiment, the cameras C to Cn are equivalent in configuration and function. The following describes the configuration and function of the camera C1.

The image sensor 11 captures an image of a prescribed imaging area. The image sensor 11 generates data indicating the captured image and transmits the data to the camera controller 14. The image sensor 11 is a charge-coupled device (CCD) image sensor or a complementary metal-oxide-semiconductor (CMOS) image sensor, for example.

The imaging area of the camera C1 is a prescribed area of the first floor of a building.

The camera communication section 12 is capable of communication with an electronic device equipped with a communication device that uses the same communication method (protocol) as the camera communication section 12. The camera communication section 12 communicates with the control device 5 through a network such as a local area network (LAN). The camera communication section 12 is a communication module (communication device) such as a LAN board, for example. According to the first embodiment, the camera communication section 12 transmits captured image data to the control device 5.

The camera storage 13 stores therein various data such as the captured image data. The camera storage 13 includes semiconductor memory. The semiconductor memory includes random-access memory (RAM) and read-only memory (ROM), for example.

The camera controller 14 controls operation of each section included in the camera C1 by executing a camera control program stored in the camera storage 13. The camera controller 14 includes a processor such as a microprocessor unit (MPU), for example.

Among the cameras C1 to Cn, a camera to which the control device 5 has set the tracking information tracks the detection target based on the captured image data. The following describes an example in which the tracking information has been set to the camera C1.

The camera controller 14 of the camera C1 detects change in the captured image through background subtraction, for example. Alternatively, the camera controller 14 may detect change in the captured image through inter-frame differencing. The camera controller 14 tracks the detection target by detecting change in the captured image.

The camera controller 14 stores the captured image data in the camera storage 13 of the camera C1 upon detecting change in the captured image. The camera controller 14 also transmits data indicating the detection of change in the captured image to the control device 5 through the camera communication section 12 of the camera C1 upon detecting change in the captured image. In the following, the data indicating the detection of change in the captured image is referred to as "change detection data".

The control device 5 controls the cameras C1 to Cn. The control device 5 includes a device communication section 51, an input device 52, an output device 53, device storage 54, and a device controller 55. The input device 52 is an example of an input section. The output device 53 is an example of a display section. The device storage 54 is an example of storage. The control device 5 is a server, for example.

The device communication section 51 is capable of communication with an electronic device equipped with a communication device that uses the same communication method (protocol) as the device communication section 51. The device communication section 51 communicates with the camera communication section 12 through the network such as a LAN. The device communication section 51 is a communication module (communication device) such as a LAN board, for example. According to the first embodiment, the device communication section 51 receives the captured image data from the camera communication section 12. The device communication section 51 receives the change detection data from the camera communication section 12 upon the camera controller 14 detecting change in the captured image.

The input device 52 receives input of a user instruction for the control device 5. Specifically, the tracking information is set to one camera among the cameras C1 to Cn by the input device 52. The tracking information includes information for tracking the detection target in the captured image. More specifically, the input device 52 inputs an imaginary movement line on an image displayed by the output device 53. This image exhibits a positional relationship of the cameras C1 to Cn. The input device 52 then sets the tracking information to one or more cameras which correspond to the imaginary movement line other than the one camera, among the cameras C1 to Cn to which the imaginary movement line has been input. According to the first embodiment, the input device 52 includes a touch sensor. Note that the input device 52 may also include a keyboard and a mouse.

The output device 53 displays the positional relationship of the cameras C1 to Cn. Specifically, the output device 53 displays the floor layout of the first floor of the building, and additionally displays the cameras C1 to Cn on the layout. The output device 53 includes a display such as a liquid-crystal display.

The device storage 54 stores therein various data such as the captured image data. The device storage 54 includes a storage device and semiconductor memory. The storage device includes either or both of a hard disk drive (HDD) and a solid-state drive (SSD), for example. The semiconductor memory includes RAM and ROM, for example.

The device controller 55 controls operation of each section included in the control device 5 by executing a device control program stored in the device storage 54. The device controller 55 includes a processor such as a central processing unit (CPU), for example.

The device controller 55 directs the output device 53 to output a captured image based on the captured image data received by the device communication section 51 upon the input device 52 receiving an output instruction for the captured image. Alternatively, the device controller 55 may direct the output device 53 to output the captured image based on the captured image data stored in the device storage 54.

Figure 2:
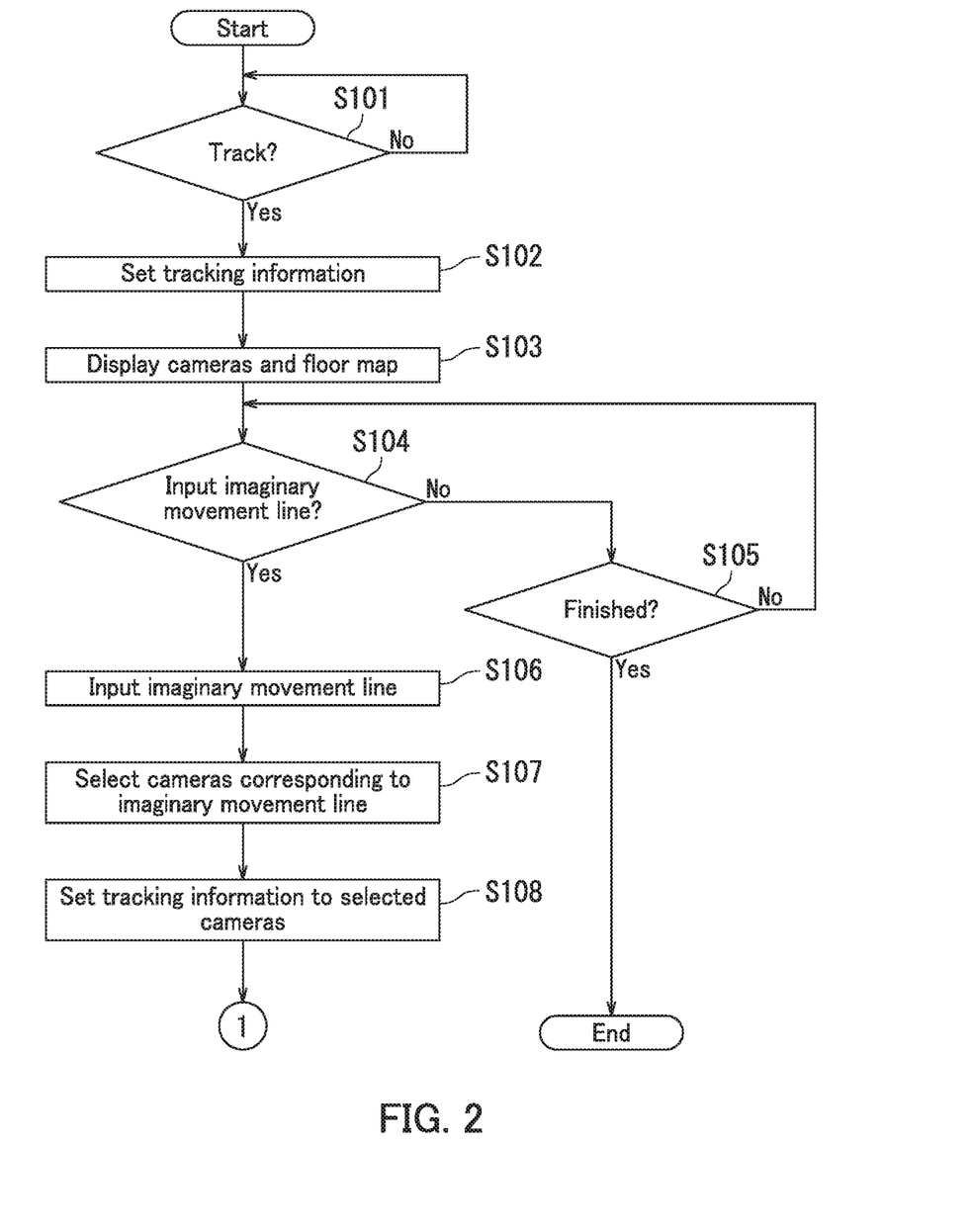
FIG. 2 is a flowchart depicting a setting process of tracking information according to the first embodiment of the present disclosure.
Figure 3:
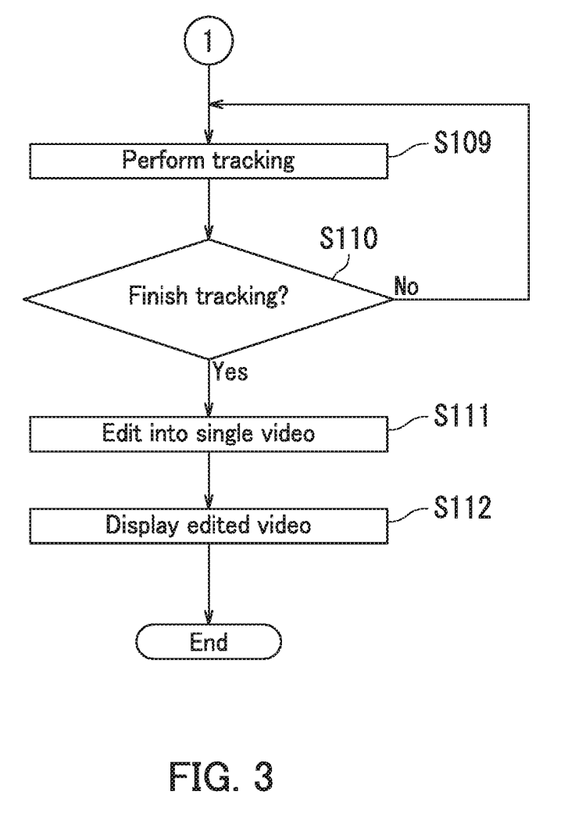
FIG. 3 is a flowchart further depicting the setting process of the tracking information according to the first embodiment of the present disclosure.

The following describes a process by which the monitoring system sets the tracking information of the detection target according to the first embodiment with reference to FIGS. 2 and 3. FIGS. 2 and 3 are flowcharts depicting the setting process of the tracking information according to the first embodiment. In the following process, the device communication section 51, the input device 52, the output device 53, and the device storage 54 operate under the control of the device controller 55. In each of the cameras C1 to Cn, the image sensor 11, the camera communication section 12, and the camera storage 13 operate under the control of the camera controller 14.

First, the setting process of the tracking information starts. Next, when a user inputs a tracking instruction using the touch sensor of the input device 52 in Step S101 (Yes in Step S101), the process advances to Step S102. In Step S102, the tracking information is set to one camera. The following describes a case in which the tracking information is set to the camera C1. When the user does not input the tracking instruction by contrast (No in Step S101), the process enters standby until the user inputs the tracking instruction. The process of setting the tracking information in Step S102 is described later in detail with reference to FIG. 4. After the tracking information has been set in Step S102, the process advances to Step S103.

In Step S103, the output device 53 displays the floor layout of the first floor of the building and the cameras C1 to Cn located on the floor layout. The output device 53 exhibits the positional relationship of the cameras C1 to Cn by displaying the floor layout and the cameras C1 to Cn. A process of displaying the floor layout and the cameras C1 to Cn in Step S103 is described later in detail. After the process of Step 103, the process advances to Step S104.

In Step S104, it is determined whether or not the input device 52 is to input an imaginary movement line based on the user instruction. The imaginary movement line is a line input by the input device 52 based on the user instruction, and indicates imagined movement of the detection target. Any one of a curve, a polygonal line, and a straight line can be used as the imaginary movement line.

When it is determined that the input device 52 is not to input an imaginary movement line in Step S104 (No in Step S104), the process advances to Step S105. In Step S105, it is determined whether or not the input device 52 has finished the setting process of the tracking information. When it is determined that the input device 52 has finished the setting process of the tracking information in Step S105 (Yes in Step S105), the setting process of the tracking information ends. When it is determined that the input device 52 has not finished the setting process of the tracking information in Step S105 (No in Step S105), the process returns to Step S104 and the input device 52 performs Step S104. When it is determined that the input device 52 is to input an imaginary movement line in Step S104 by contrast (Yes in Step S104), the process advances to Step S106.

In Step S106, the input device 52 inputs the imaginary movement line. The process of inputting the imaginary movement line in Step S106 is described later in detail with reference to FIGS. 5 to 7. After the imaginary movement line has been input in Step S106, the process advances to Step S107.

In Step S107, the input device 52 selects one or more cameras to which the tracking information is to be set among the cameras C1 to Cn. In Step S107, cameras corresponding to the imaginary movement line are selected from the cameras C2 to Cn aside from the camera C1 to which the tracking information has already been set. The process of selecting cameras to which the tracking information is to be set in Step S107 is described later in detail with reference to FIG. 7. After cameras to which the tracking information is to be set have been selected in Step S107, the process advances to Step S108.

In Step S108, the input device 52 sets the tracking information to the selected cameras. The tracking information set to the selected cameras is the same tracking information as the tracking information set to the camera C1 by the input device 52 in Step S102 and stored by the device storage 54.

The input device 52 reads the tracking information stored by the device storage 54 and outputs information specifying the selected cameras and the tracking information to the device communication section 51. The device communication section 51 sets the tracking information to the selected cameras by communicating with the camera communication section 12 of each selected camera. A procedure for setting the tracking information to the selected cameras is the same as a procedure for setting the tracking information to the camera C1 in Step S102. Therefore, the same tracking information as the tracking information of the camera C1 is set to all selected cameras, and the selected cameras become capable of tracking.

As such, when the detection target moves from the prescribed imaging area into another imaging area, the tracking information of the detection target can be easily set by the input device 52 setting the tracking information to the cameras corresponding to the imaginary movement line among the cameras C2 to Cn aside from the camera C1.

The same tracking information is set to the cameras selected by the input device 52 in Step S107 as the camera C1 selected by the user in Step S102 among the cameras C1 to Cn. As a result, the detection target can be tracked with particularly high efficiency when the detection target is the face or the entire body of the specific person. That is, highly efficient tracking can be performed by setting the same tracking information to each camera when the detection target is the face or the entire body of the specific person because the size of the detection target does not change.

After the tracking information has been set to the cameras selected by the input device 52 in Step S108, the process advances to Step S109.

In Step S109, the cameras to which the tracking information is set perform tracking of the detection target. That is, the camera controller 14 of each camera to which the tracking information is set performs a known tracking process to track the detection target based on captured image data indicating an image captured by the image sensor 11 of the camera. The camera controller 14 of each camera to which the tracking information is set then transmits change detection data indicating that change in the captured image has been detected to the control device 5 through the camera communication section 12 thereof upon detecting change in the captured image.

The camera controller 14 of each camera to which the tracking information is set generates a flag and a time as change detection data. The process of generating the change detection data, the flag, and the time is described later in detail with reference to FIG. 8. After the process of Step S109, the process advances to Step S110.

In Step S110, it is determined whether or not the tracking by the cameras has finished. When the input device 52 inputs an instruction to finish the tracking by the cameras according to a user operation of the touch panel of the input device 52 (Yes in Step S110), the cameras finish tracking and the process advances to Step S111. When the input device 52 does not input the instruction to finish the tracking by the cameras by contrast (No in Step S110), the process returns to Step S109. In Step S109, the tracking by the cameras is performed continuously.

In Step S11, the control device 5 acquires multiple captured images with flags set to on from the cameras C1 to Cn and edits the multiple captured images into a single video. Note that the output device 53 may acquire the multiple captured images with flags set to on from the cameras C1 to Cn and edit the multiple captured images into a single image. A process of editing the multiple captured images into the single video in Step S11 is described later with reference to FIG. 8. After the process of Step S111, the process advances to Step S112.

In Step S112, the output device 53 transmits the edited video to a terminal used by the administrator of the monitoring system 100. As a result, the administrator can examine the single video in which a specific subject has been detected. The output device 53 may also display the single edited video on the display of the output device 53.

In Step S112, the setting process of the tracking information ends when the output device 53 finishes transmitting the single edited video.

According to the monitoring system 100 of the first embodiment, the detection target can be easily set to be tracked when the detection target moves from the prescribed imaging area to another imaging area. Also according to the monitoring system 100 of the first embodiment, the captured images in which a specific detection target has been detected can be edited into a single video.

Note that the first embodiment is described using an example in which the output device 53 displays the floor layout of the first floor of the building and the cameras C1 to Cn, but the present disclosure is not limited as such. The output device 53 may display floor layouts of multiple floors and the cameras C1 to Cn.

Figure 4:
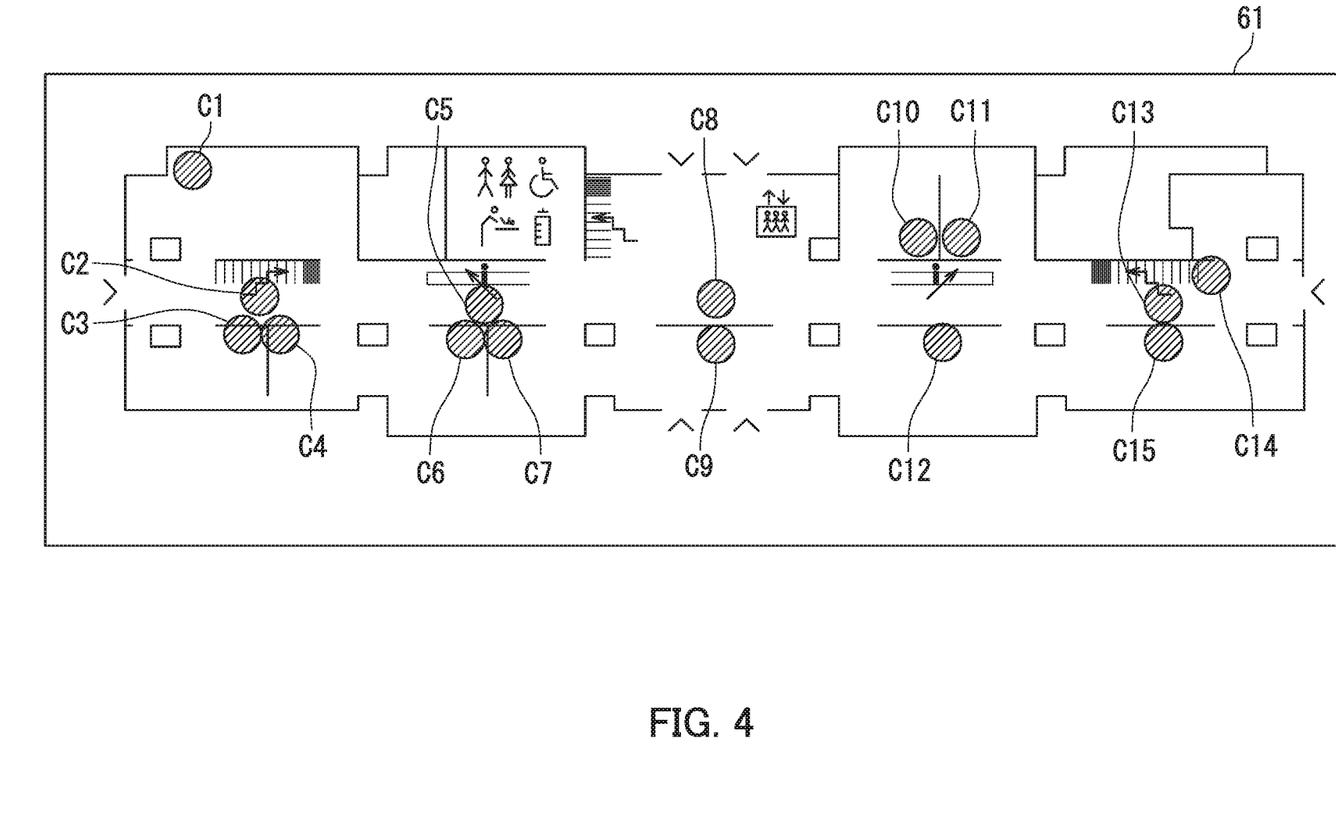
FIG. 4 is a diagram illustrating an example of a tracking information setting screen according to the first embodiment of the present disclosure.

The following describes the process of setting the tracking information in Step S102 in detail with reference to FIG. 4.

FIG. 4 is a diagram illustrating an example of a tracking information setting screen according to the first embodiment of the present disclosure. A screen 61 is the tracking information setting screen. The screen 61 exhibits the floor layout of the first floor of the building and the cameras C1 to Cn. The screen 61 is displayed on the display of the output device 53.

In Step S101, one camera to which the tracking information is to be set among the cameras C1 to Cn is selected by the user through the input device 52. Specifically, when the user touches any one of the cameras C1 to C15 displayed in the screen 61 using the touch sensor of the input device 52, the input device 52 selects the one camera that has been touched among the cameras C1 to C15 in the screen 61. The following describes an example in which the user selects the camera C1.

The tracking information is then set to the camera C1 selected by the user. Herein, the tracking information is information for tracking the detection target exhibited in the image captured by the camera. Specifically, the tracking information includes a detection area covering the detection target exhibited in the captured image. The tracking information also includes tracking parameters necessary for tracking a face when the detection target is the face of the specific person. Examples of the tracking parameters when tracking a face include the size, position, direction, and inclination of the face of the specific person. The tracking information also includes tracking parameters necessary for tracking an entire body when the detection target is the entire body of the specific person. Examples of the tracking parameters when tracking an entire body include clothing color, clothing variety, and gender of the tracking target person.

The setting of the tracking information is performed based on the captured image of the camera C1. Specifically, the output device 53 displays the captured image exhibiting the detection target. According to the user instruction, the input device 52 then inputs the detection area including the detection target to set the detection area. When the detection target is the face of the specific person, the input device 52 may also automatically input the tracking parameters necessary for tracking by processing an image within the detection area of the captured image. Alternatively, when the detection target is the face of the specific person, the output device 53 may display a menu screen for inputting the parameters necessary for tracking. The input device 52 may then input the tracking parameters necessary for tracking according to a user instruction in the menu screen. When the detection target is the entire body of the specific person, the tracking parameters can be input in the same manner as the case in which the detection target is the face of the specific person.

The input device 52 outputs the input tracking information to the device storage 54, and the device storage 54 stores therein the tracking information output from the input device 52. The input device 52 then outputs the input tracking information and information specifying the camera C1 to the device communication section 51. The camera C1 specified by the information specifying the camera C1 communicates with the device communication section 51. The device communication section 51 transmits the tracking information input to the camera communication section 12 of the camera C1. Upon receiving the tracking information, the camera communication section 12 outputs the received tracking information to the camera storage 13 of the camera C1. The camera storage 13 stores the output tracking information therein. The tracking information is set to the camera C1 by the camera storage 13 storing the tracking information therein. As described with reference to FIG. 4, the tracking information is set to the single selected camera C1, and the camera C1 becomes capable of tracking.

The following describes the process of displaying the floor layout and the cameras C1 to Cn in Step S103 in detail with reference to FIG. 4.

The output device 53 displays the screen 61 illustrated in FIG. 4 in a similar manner as in Step S102. Fifteen cameras C1 to C15 are displayed on the floor layout in the screen 61. The output device 53 as such exhibits a positional relationship of the cameras C1 to C15 by displaying the cameras C1 to C15 on the floor layout.

The following describes the process of inputting the imaginary movement line in Step S106 in detail with reference to FIGS. 4 to 7.

Figure 5:
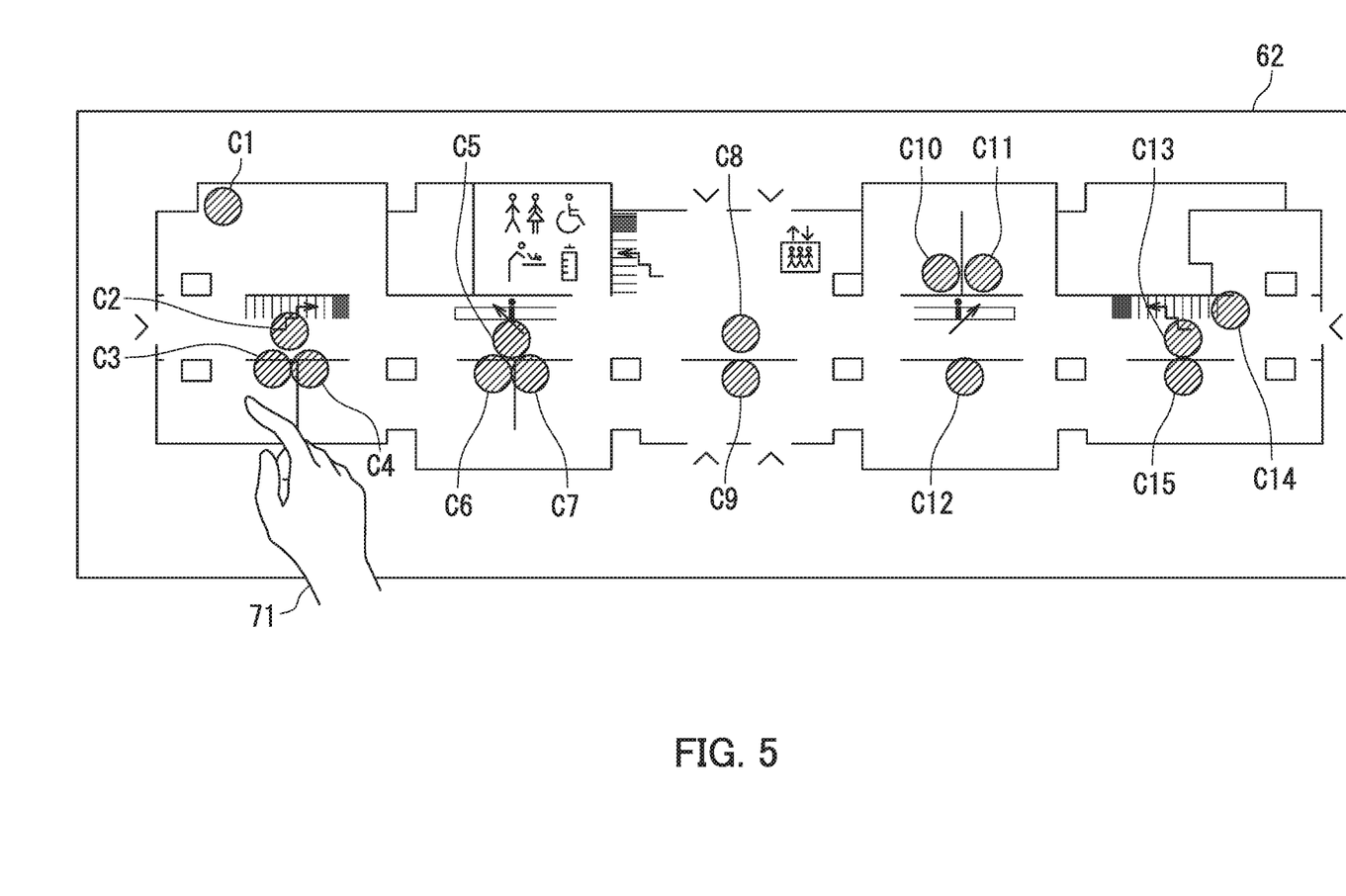
FIG. 5 is a diagram illustrating an example of a candidate of an imaginary movement line in the tracking information setting screen according to the first embodiment of the present disclosure.
Figure 6:
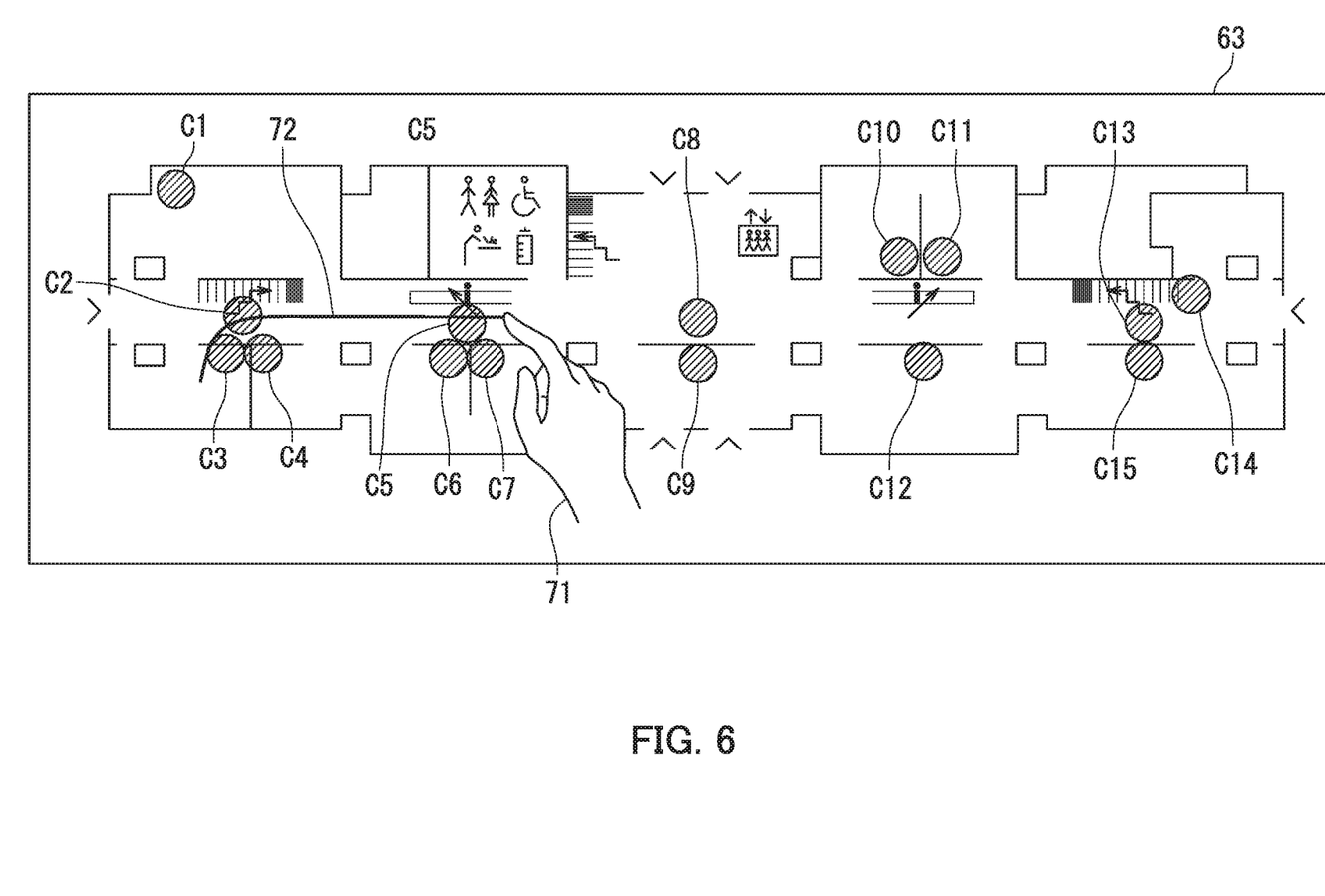
FIG. 6 is a diagram further illustrating the example of the candidate of the imaginary movement line in the tracking information setting screen according to the first embodiment of the present disclosure.
Figure 7:
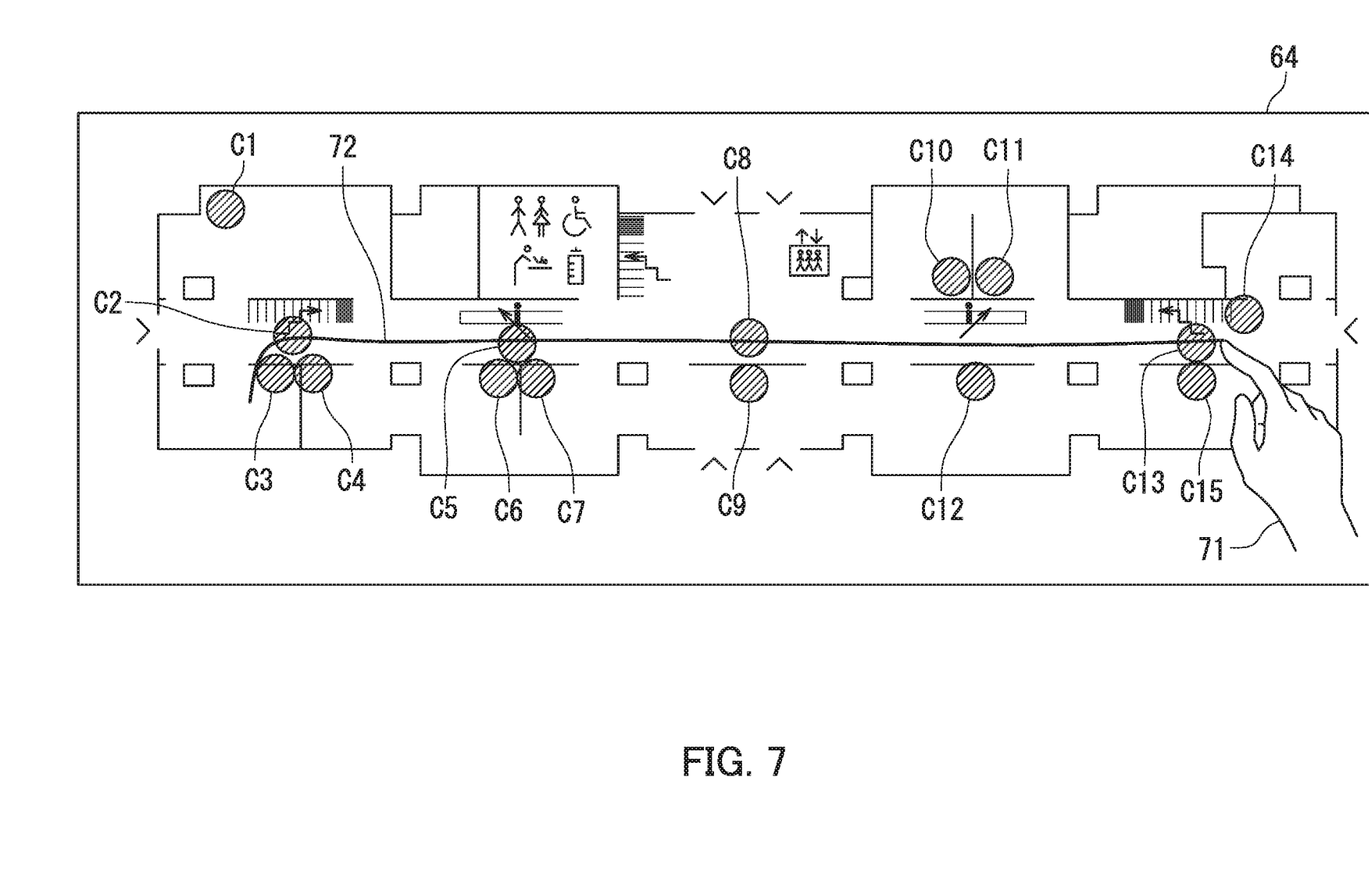
FIG. 7 is a diagram further illustrating the example of the candidate of the imaginary movement line in the tracking information setting screen according to the first embodiment of the present disclosure.

FIGS. 5 to 7 are diagrams illustrating an example of a candidate of the imaginary movement line in the tracking information setting screen according to the first embodiment of the present disclosure.

FIG. 5 illustrates a screen 62. The screen 62 is a screen for inputting the imaginary movement line. The screen 62 includes the cameras C1 to C15 and a finger 71. The finger 71 is a finger of the user used to input the imaginary movement line. The screen 62 exhibits the floor layout of the first floor of the building and the cameras C1 to C15. The screen 62 is displayed on the display of the output device 53.

FIG. 6 illustrates a screen 63. The screen 63 is a screen for inputting the imaginary movement line. The screen 63 includes the cameras C1 to C15, the finger 71, and a candidate 72 of the imaginary movement line. The candidate 72 of the imaginary movement line is input by the input device 52. The screen 63 is displayed on the display of the output device 53.

FIG. 7 illustrates a screen 64. The screen 64 is a screen for inputting the imaginary movement line. The screen 64 includes the cameras C1 to C15, the finger 71, and the candidate 72 of the imaginary movement line. The screen 64 is displayed on the display of the output device 53.

In Step S106, the user touches the touch sensor of the input device 52 with the finger 71 while the output device 53 is displaying the screen 61 illustrated in FIG. 4 to specify a position in the screen 61 as a start point of movement of the detection target, which is a start point of the imaginary movement line. The output device 53 displays the screen 62 illustrated in FIG. 5 when the user specifies the start point of the imaginary movement line. The screen 62 exhibits that the finger 71 of the user is touching in the vicinity of the camera C3. The start point of the imaginary movement line is displayed in a position corresponding to the finger 71 of the user (directly under the finger 71 of the user) in the screen 62 illustrated in FIG. 5.

Next, the user moves the finger 71 as exhibited in the screen 63 illustrated in FIG. 6 while touching the touch sensor of the input device 52 with the finger 71. In the screen 63 illustrated in FIG. 6, the finger 71 of the user moves into the vicinity of the camera C5. The output device 53 displays the candidate 72 of the imaginary movement line as the finger 71 of the user moves while touching the touch sensor. The candidate 72 of the imaginary movement line is input by the input device 52. Specifically, the output device 53 displays the candidate 72 of the imaginary movement line in the screen 63 illustrated in FIG. 6. In the screen 63, the candidate 72 of the imaginary movement line is displayed as a curve from the vicinity of the camera C2 to the camera C5.

Furthermore, when the user moves the finger 71 while touching the touch sensor, the output device 53 continues displaying the candidate 72 of the imaginary movement line following the movement of the finger 71 of the user. The screen 64 in FIG. 7 exhibits a case in which the user moves the finger 71 into the vicinity of the camera C13 while touching the touch sensor with the finger 71. In the screen 64, the output device 53 displays the candidate 72 of the imaginary movement line. The candidate 72 of the imaginary movement line is displayed from the vicinity of the camera C3 to the camera C13 by way of the cameras C2, C5, and C8.

Note that when the user moves the finger 71 while touching the touch sensor, the input of the candidate 72 of the imaginary movement line can be restricted such that the candidate 72 of the imaginary movement line does not pass through a wall upon the finger 71 of the user moving through a wall in the floor layout. The input of the candidate 72 of the imaginary movement line can be performed realistically by restricting the input of the candidate 72 of the imaginary movement line such that the candidate 72 of the imaginary movement line does not pass through a wall in the layout.

Finally, when the user touches the touch sensor of the input device 52 again after removing the finger 71 from the touch sensor of the input device 52, the candidate 72 of the imaginary movement line is decided to be the imaginary movement line, and the input device 52 outputs the decided imaginary movement line to the device storage 54. The device storage 54 stores therein the decided imaginary movement line output from the input device 52.

The candidate 72 of the imaginary movement line can also be erased and the imaginary movement line can be re-input after the user has removed the finger 71 from the touch sensor of the input device 52. Specifically, the output device 53 displays a user interface (not illustrated) for erasing the candidate 72 of the imaginary movement line. When the user instructs erasure of the candidate 72 of the imaginary movement line using such a user interface, the input device 52 inputs the instruction to erase the candidate 72 of the imaginary movement line. The input device 52 then erases the candidate 72 of the imaginary movement line according to the instruction. Thereafter, the input device 52 re-inputs the candidate 72 of the imaginary movement line according to the process of Step S106 illustrated in FIGS. 4 to 7.

The following describes the process of selecting the cameras to which the tracking information is to be set in Step S107 in detail with reference to FIG. 7.

An example is described in which the decided imaginary movement line is the candidate 72 of the imaginary movement line displayed in the screen 64 in FIG. 7.

In Step S107, one or more cameras corresponding to the imaginary movement line are selected from the cameras C2 to C15 aside from the camera C1 to which the tracking information has already been set. When the candidate 72 of the imaginary movement line is decided as the imaginary movement line as exhibited in the screen 64, the input device 52 selects the cameras C3, C2, C5, C8, and C13. The output device 53 displays the cameras selected by the input device 52 and the cameras not selected by the input device 52 in different colors. Therefore, the selected cameras can be easily understood by the user.

The input device 52 selects the cameras corresponding to the imaginary movement line among the cameras C1 to C15. Herein, "selecting the cameras corresponding to the imaginary movement line" means one or both of the following two cases. The first case is a case in which cameras positioned in the vicinity of the imaginary movement line are selected. The second case is a case in which cameras whose capturable image range intersects with the imaginary movement line are selected. The following describes the two cases.

(Case in which Cameras Positioned in Vicinity of Imaginary Movement Line are Selected)

In this case, the input device 52 selects all cameras positioned in the vicinity of the imaginary movement line among the cameras C1 to C15. Herein, the determination of whether or not the cameras are positioned in the vicinity of the imaginary movement line is performed by determining that a camera is in the vicinity of the imaginary movement line when the shortest distance between the imaginary movement line and a central position of the camera is shorter than or equal to a prescribed distance. The prescribed distance can be appropriately set according to the scale of the floor layout. Specifically, one meter can be set as the prescribed distance when the width of a typical hallway in the floor layout is three meters. As such, the prescribed distance is preset according to the width of a hallway in the floor layout.

(Case in which Cameras Whose Capturable Image Range Intersects with Imaginary Movement Line are Selected)

In this case, the device storage 54 in FIG. 1 stores therein data indicating the image capturable ranges of the respective cameras C1 to Cn. The input device 52 then determines whether or not the imaginary movement line intersects with the image capturable range with respect to each of the cameras C1 to Cn by reading out the data indicating the image capturable range of the camera from the device storage 54. When the imaginary movement line intersects with the image capturable range of a camera, the input device 52 selects the camera. Note that while the image capturable range where images are capturable by the camera is actually three-dimensional space, two-dimensional area data obtained by projecting the image capturable range on the floor layout can for example be used as the data indicating the image capturable range.

Figure 8:
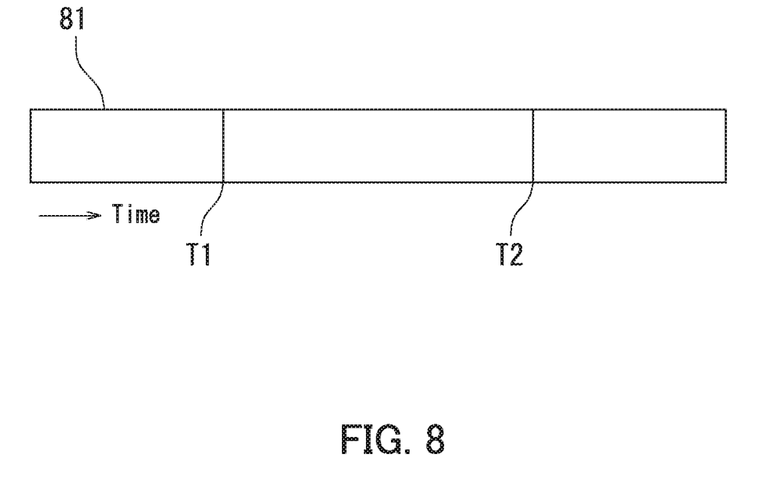
FIG. 8 is a diagram illustrating an example of captured image data according to the first embodiment of the present disclosure.

The following describes the process of generating the change detection data, the flag, and the time in Step S109 in detail with reference to FIG. 8.

FIG. 8 is a diagram illustrating an example of captured image data according to the first embodiment of the present disclosure. Captured image data 81 includes captured image data of detection targets. The horizontal axis of the captured image data 81 is the time. A time T1 indicates a time at which the tracking of a detection target is started. A time T2 indicates a time at which the tracking of the detection target is ended. A flag indicating whether or not a detection target is being tracked is provided for each detection target in the captured image data 81.

An example is described in which the tracking information is set to the camera C1. The description of camera 1 also applies to the other cameras to which the tracking information is set.

In Step S109, the camera controller 14 of the camera C1 tracks a detection target based on the captured image data 81. The flag of the captured image data 81 is initially set to off. When detecting the detection target in the captured image data 81, the camera controller 14 sets the flag to on.

The flag is provided for each detection target. When the camera controller 14 detects the specific detection target in the captured image data 81, the flag corresponding to the specific detection target is then set to on. The camera controller 14 then combines a start time and an end time of the detection of the specific detection target with the flag corresponding to the specific detection target and records the start time, the end time, and the flag as change detection data.

In the captured image data 81 as described above, the tracking of the specific detection target starts at the time T1 and ends at the time T2.

In this case, the camera controller 14 detects the specific detection target when the time reaches the time T1. The camera controller 14 turns on the flag corresponding to the specific detection target when the time reaches the time T1. Between the time T1 and the time T2, the camera controller 14 continuously detects the specific detection target. When the time has exceeded the time T2, the camera controller 14 stops detecting the specific detection target. When the time reaches the time T2, the camera controller 14 combines the flag corresponding to the specific detection target, the time T1 at which the tracking of the specific detection target starts, and the time T2 at which the tracking of the specific detection target ends, and records the flag, the time T1, and the time T2 as the change detection data.

The camera controller 14 stores the captured image data in the camera storage 13 when a specific detection target is detected. The camera controller 14 sets a flag for each specific detection target, combines the flag, a start time T1, and an end time T2, and records the flag, the start time T1, and the end time T2 as the change detection data.

The following describes the process of editing the multiple captured images into the single video in Step S111 with reference to FIG. 8.

In Step S111, the device controller 55 controls the device communication section 51. Under the control of the device controller 55, the device communication section 51 performs communication with the cameras C1 to Cn, acquires the captured image data stored in the camera storage 13 of each camera C1 to Cn, and outputs the captured image data to the device storage 54. The device storage 54 stores therein the captured image data output from the device communication section 51. The output device 53 specifies captured image data in which the flag corresponding to the specific detection target is on among the captured image data stored in the device storage 54. The output device 53 generates an order list. The order list is a list in which pieces of information each specifying the captured image data are arranged. In the order list, the pieces of information each specifying the captured image data in which the flag is on are arranged in chronological order according to the start time T1 in the captured image data.

The output device 53 then sequentially joins portions of the captured image data from the time T1 to the time T2 in the sequence of the captured image data specified in the generated order list and edits the portions into the single video. As a result, the single video is generated in which the specified detection target is detected.

Second Embodiment

Figure 9:
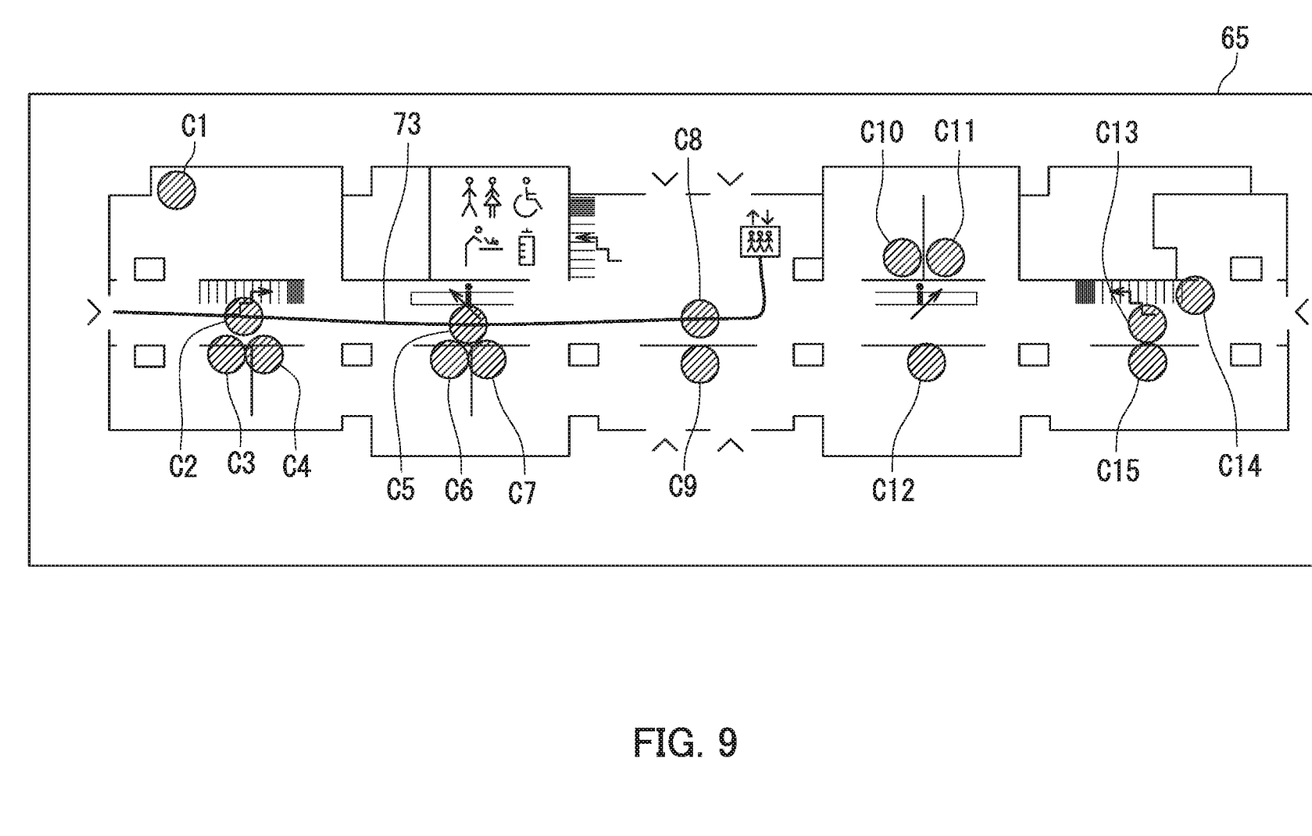
FIG. 9 is a diagram illustrating an example of a movement line of a detection target in a tracking information setting screen according to a second embodiment of the present disclosure.

The following describes a monitoring system 100 according to a second embodiment of the present disclosure with reference to FIGS. 1 and 9.

The monitoring system according to the second embodiment differs from the monitoring system 100 according to the first embodiment in that an image exhibiting a pre-collected movement line 73 a detection target is displayed. The following mainly describes a function of displaying the image exhibiting the movement line 73 according to the second embodiment.

The monitoring system according to the second embodiment differs from the monitoring system 100 according to the first embodiment due to the movement line image display function.

FIG. 9 is a diagram illustrating an example of the movement line of the detection target in a tracking information setting screen according to the second embodiment of the present disclosure. A screen 65 is a screen for inputting an imaginary movement line. The screen 65 includes cameras C1 to C15 and the movement line 73. The screen 65 exhibits a floor layout of the first floor of a building, the cameras C1 to Cn, and the movement line 73. The screen 65 is displayed on a display of an output device 53.

In Step S102 in FIG. 2, the output device 53 also displays the movement line 73 as exhibited in the screen 65 when the control device 5 inputs the imaginary movement line.

The movement line 73 is pre-generated based on tracking of the detection target performed prior, and is stored in the device storage 54. Because the output device 53 displays the movement line 73 of the detection target, the user can be supported when inputting an imaginary movement line. Specifically, the user moves a finger 71 over the movement line 73 in the screen 65 while touching the touch sensor of the output device 53. Therefore, the user can easily input an imaginary movement line that has a high possibility of matching the movement of the detection target. The imaginary movement line is input in the same manner as in Step S106 in FIG. 2.

The second embodiment is described using an example in which the output device 53 displays the movement line 73, but the present disclosure is not limited to the movement line 73. The output device 53 may display a heat map exhibiting accumulation of detection targets on the floor layout instead of the movement line 73.

Third Embodiment

Figure 10:
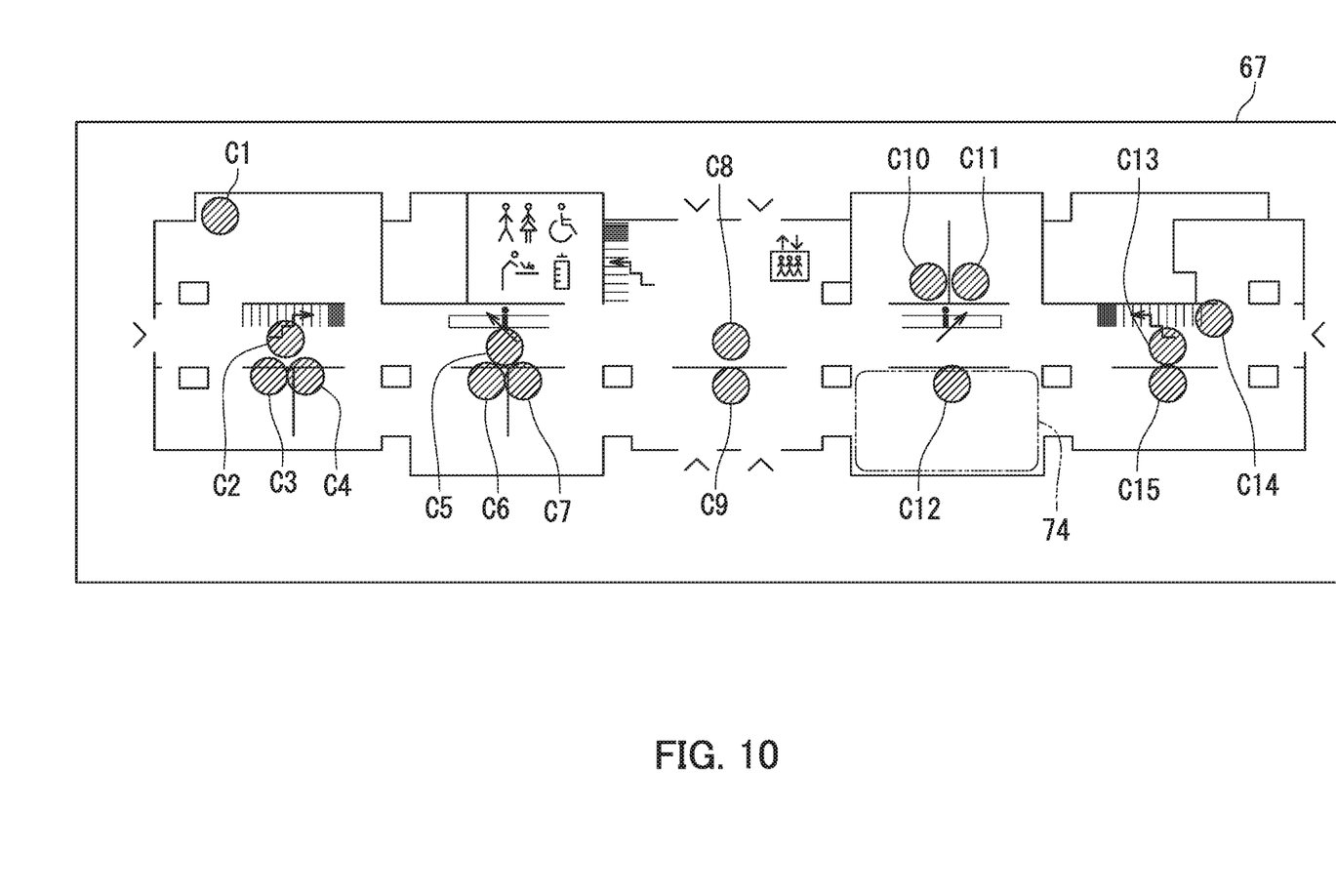
FIG. 10 is a diagram illustrating an example of an image capturable range of a camera in a tracking information setting screen according to a third embodiment of the present disclosure.

The following describes a monitoring system 100 according to a third embodiment with reference to FIGS. 1 and 10.

The monitoring system according to the third embodiment differs from the monitoring system 100 of the first embodiment in that an image capturable range of a camera is displayed. The following mainly describes a function of displaying the image capturable range of the camera according to the third embodiment.

The monitoring system according to the third embodiment differs from the monitoring system 100 according to the first embodiment due to the image capturable range display function.

FIG. 10 is a diagram illustrating an example of an image capturable range of a camera in a tracking information setting screen according to the third embodiment of the present disclosure.

The screen 67 is a screen for inputting an imaginary movement line. The screen 67 includes the cameras C1 to C15 and an image capturable range 74. The screen 67 exhibits a floor layout of the first floor of a building, the cameras C1 to C15, and the image capturable range 74. The screen 67 is displayed on a display of an output device 53.

In Step S102 in FIG. 2, the output device 53 also displays the image capturable range 74 as exhibited in the screen 67 when the control device 5 inputs an imaginary movement line.

In the screen 67, the output device 53 displays the image capturable range 74 of the camera C12.

In the screen 67, the output device 53 displays the image capturable range 74 of the camera C12 selected through the input device 52, but the output device 53 may display image capturable ranges of all the cameras C1 to C15.

Because the output device 53 displays the image capturable range 74 of a camera, the user can easily understand a range in which the detection target can be tracked.

The embodiments of the present disclosure are described above with reference to the drawings (FIGS. 1 to 10). However, the present disclosure is not limited to the above embodiments and may be implemented in various manners within a scope not departing from the gist of the present disclosure.

For example, items described according to each of the first to third embodiments may be appropriately combined. For another example, the configuration described according to the second embodiment may be combined with the configuration described according to the third embodiment.

Note that the drawings illustrate main elements of configuration schematically to facilitate understanding. Accordingly, aspects such as thickness and length of the elements of configuration may differ in practice out of convenience for the preparation of the drawings.

What is claimed is:

1. A control device for controlling a plurality of imaging devices, comprising:
    storage configured to store therein an image captured by each imaging device of the plurality of imaging devices;
    a display section configured to display an image exhibiting a positional relationship of the plurality of imaging devices; and
    an input section configured to receive input of an operation from a user, wherein
    the input section
        receives an operation through which one imaging device exhibited by the image exhibiting the positional relationship is selected from the image,
        sets, to the selected one imaging device, tracking information for tracking a specific tracking target in an image captured by the one imaging device, and
        receives an operation through which an imaginary movement line is input on the image exhibiting the positional relationship,
    the imaginary movement line is a line input by the input section based on an instruction of the user, and includes a position touched by a finger of the user in the image exhibiting the positional relationship, movement of the finger, and a position at which the finger is removed from the image exhibiting the positional relationship,
    the display section displays the imaginary movement line received by the input section as superimposed on the image exhibiting the positional relationship, and
    the input section
        selects one or more imaging devices corresponding to the imaginary movement line from the plurality of imaging devices exhibited by the image exhibiting the positional relationship and sets the tracking information to the selected one or more imaging devices other than the one imaging device from the plurality of imaging devices,
        determines, for each of the plurality of imaging devices, whether or not a distance between the imaginary movement line and the imaging device is equal to or shorter than a prescribed distance based on the imaginary movement line and the image exhibiting the positional relationship, and
        selects the imaging device when the distance between the imaginary movement line and the imaging device is equal to or shorter than the prescribed distance.

2. The control device according to claim 1, wherein the display section edits the image captured by each imaging device of the plurality of imaging devices into a single image.

3. The control device according to claim 2, wherein each of the captured images has a flag, and
each of the imaging devices turns on the flag of a captured image which includes an image exhibiting the specific tracking target, and the display section acquires a plurality of the captured images in which the flag is on and edits the captured images in which the flag is on into the single image.

4. The control device according to claim 1, wherein the tracking information includes a detection area covering an image exhibiting the specific tracking target.

5. The control device according to claim 1, wherein the display section displays a movement line of the specific tracking target.

6. The control device according to claim 1, wherein the display section displays an image capturable range of one or more of the imaging devices.

7. The control device according to claim 1, wherein the display section displays the image exhibiting the positional relationship of the plurality of imaging devices by displaying the plurality of imaging devices and a floor layout on which the plurality of imaging devices are located.

8. A monitoring system comprising:
a plurality of imaging devices; and
a control device for controlling the plurality of imaging devices, wherein
the control device includes:
storage configured to store therein an image captured by each imaging device of the plurality of imaging devices;
a display section configured to display an image exhibiting a positional relationship of the plurality of imaging devices; and
an input section configured to receive input of an operation from a user,
the input section
receives an operation through which one imaging device exhibited by the image exhibiting the positional relationship is selected from the image,
sets, to the selected one imaging device, tracking information for tracking a specific tracking target in an image captured by the one imaging device, and
receives an operation through which an imaginary movement line is input on the image exhibiting the positional relationship,
the imaginary movement line is a line input by the input section based on an instruction of the user, and includes a position touched by a finger of the user in the image exhibiting the positional relationship, movement of the finger, and a position at which the finger is removed from the image exhibiting the positional relationship,
the display section displays the imaginary movement line received by the input section as superimposed on the image exhibiting the positional relationship, and
the input section
selects one or more imaging devices corresponding to the imaginary movement line from the plurality of imaging devices exhibited by the image exhibiting the positional relationship and sets the tracking information to the selected one or more imaging devices other than the one imaging device from the plurality of imaging devices,
determines, for each of the plurality of imaging devices, whether or not a distance between the imaginary movement line and the imaging device is equal to or shorter than a prescribed distance based on the imaginary movement line and the image exhibiting the positional relationship, and
selects the imaging device when the distance between the imaginary movement line and the imaging device is equal to or shorter than the prescribed distance.

9. A monitoring camera control method for controlling, with a control device, a plurality of imaging devices, the method comprising:
storing, with the control device, an image captured by each imaging device of the plurality of imaging devices;
displaying, with the control device, an image exhibiting a positional relationship of the plurality of imaging devices;
receiving, with the control device, input of an operation through which one imaging device exhibited by the image exhibiting the positional relationship is selected from the image;
setting, with the control device to the selected one imaging device, tracking information for tracking a specific tracking target in an image captured by the one imaging device;
receiving, with the control device, an operation through which an imaginary movement line is input on the image exhibiting the positional relationship;
displaying, with the control device, the imaginary movement line as superimposed on the image exhibiting the positional relationship;
selecting, with the control device, one or more imaging devices corresponding to the imaginary movement line from the plurality of imaging devices exhibited by the image exhibiting the positional relationship and setting the tracking information to the selected one or more imaging devices other than the one imaging device from the plurality of imaging devices;
determining, with the control device, for each of the plurality of imaging devices, whether or not a distance between the imaginary movement line and the imaging device is equal to or shorter than a prescribed distance based on the imaginary movement line and the image exhibiting the positional relationship; and
selecting, with the control device, the imaging device when the distance between the imaginary movement line and the imaging device is equal to or shorter than the prescribed distance, wherein
the imaginary movement line is a line input based on an instruction of a user, and includes a position touched by a finger of the user in the image exhibiting the positional relationship, movement of the finger, and a position at which the finger is removed from the image exhibiting the positional relationship.

10. The image forming apparatus according to claim 1, wherein
the input section
determines, for each of the plurality of imaging devices, whether or not the imaginary movement line intersects with an image capturable range of the imaging device based on the imaginary movement line, the image capturable range, and the image exhibiting the positional relationship, and
selects the imaging device when the imaginary movement line intersects with the imaging range of the imaging device.

* * * * *